(12) United States Patent
Laflaquiere

(10) Patent No.: US 12,158,546 B2
(45) Date of Patent: Dec. 3, 2024

(54) EMITTERS BEHIND DISPLAY

(71) Applicant: Apple Inc., Cupertino, CA (US)

(72) Inventor: Arnaud Laflaquiere, Paris (FR)

(73) Assignee: APPLE INC., Cupertino, CA (US)

( * ) Notice: Subject to any disclaimer, the term of this patent is extended or adjusted under 35 U.S.C. 154(b) by 818 days.

(21) Appl. No.: 17/214,960

(22) Filed: Mar. 29, 2021

(65) Prior Publication Data

US 2021/0318418 A1    Oct. 14, 2021

Related U.S. Application Data

(60) Provisional application No. 63/008,852, filed on Apr. 13, 2020.

(51) Int. Cl.
*G01S 7/4865* (2020.01)
*G01S 7/4861* (2020.01)
*G02B 3/00* (2006.01)

(52) U.S. Cl.
CPC .......... *G01S 7/4865* (2013.01); *G01S 7/4861* (2013.01); *G02B 3/0056* (2013.01)

(58) Field of Classification Search
CPC ... G01S 7/4865; G01S 7/4861; G02B 3/0056; G09G 2300/023; G09G 2300/0426; G09G 2320/0693; G09G 3/20; G09G 3/3225; G09G 3/006; H10K 59/00
See application file for complete search history.

(56) References Cited

U.S. PATENT DOCUMENTS

| 2012/0062817 A1 | 3/2012 | Kanbayashi et al. |
| 2018/0219171 A1 | 8/2018 | Kim et al. |
| 2019/0179028 A1 | 6/2019 | Pacala et al. |

(Continued)

FOREIGN PATENT DOCUMENTS

| WO | 2007072358 A2 | 6/2007 |
| WO | 2011025644 A1 | 3/2011 |

(Continued)

OTHER PUBLICATIONS

International Application # PCT/US2021/024548 Search Report dated Jul. 8, 2021.

(Continued)

*Primary Examiner* — Thanh Luu
*Assistant Examiner* — Monica T Taba
(74) *Attorney, Agent, or Firm* — MEITAR PATENTS LTD.

(57) ABSTRACT

An optoelectronic device includes a display, including a first substrate, which is transparent to optical radiation at a given wavelength, and a first array of display cells including pixel circuit elements disposed on the first substrate at a first pitch, with gaps of a predefined size between the pixel circuit elements. An emitter array includes a second substrate, parallel and in proximity to the first substrate, and a second array of emitters, which are disposed on the second substrate at a second pitch that is different from the first pitch, and which are configured to emit optical radiation at the given wavelength toward the first substrate. Control circuitry is configured to identify the emitters that are aligned with the gaps between the pixel circuit elements and to selectively drive the identified emitters to emit the optical radiation through the gaps.

20 Claims, 7 Drawing Sheets

(56) References Cited

U.S. PATENT DOCUMENTS

| | | | |
|---|---|---|---|
| 2019/0311666 A1* | 10/2019 | Chen | G01S 7/4816 |
| 2019/0346939 A1 | 11/2019 | Na et al. | |
| 2019/0363520 A1 | 11/2019 | Laflaquiere et al. | |
| 2019/0377067 A1 | 12/2019 | Han et al. | |
| 2020/0251882 A1 | 8/2020 | Lyon et al. | |
| 2020/0258867 A1* | 8/2020 | Harrold | H01L 33/58 |
| 2020/0288070 A1* | 9/2020 | Siala | G01S 17/89 |
| 2021/0036047 A1* | 2/2021 | Heo | H01L 27/14652 |

FOREIGN PATENT DOCUMENTS

| | | | |
|---|---|---|---|
| WO | 2017214582 A1 | 12/2017 | |
| WO | 2019057897 A1 | 3/2019 | |

OTHER PUBLICATIONS

IN Application # 202217063038 Office Action dated Mar. 2, 2023.
KR Application # 1020227036390 Office Action dated Dec. 14, 2023.
CN Application # 202180028018.0 Office Action dated Aug. 12, 2024.

* cited by examiner

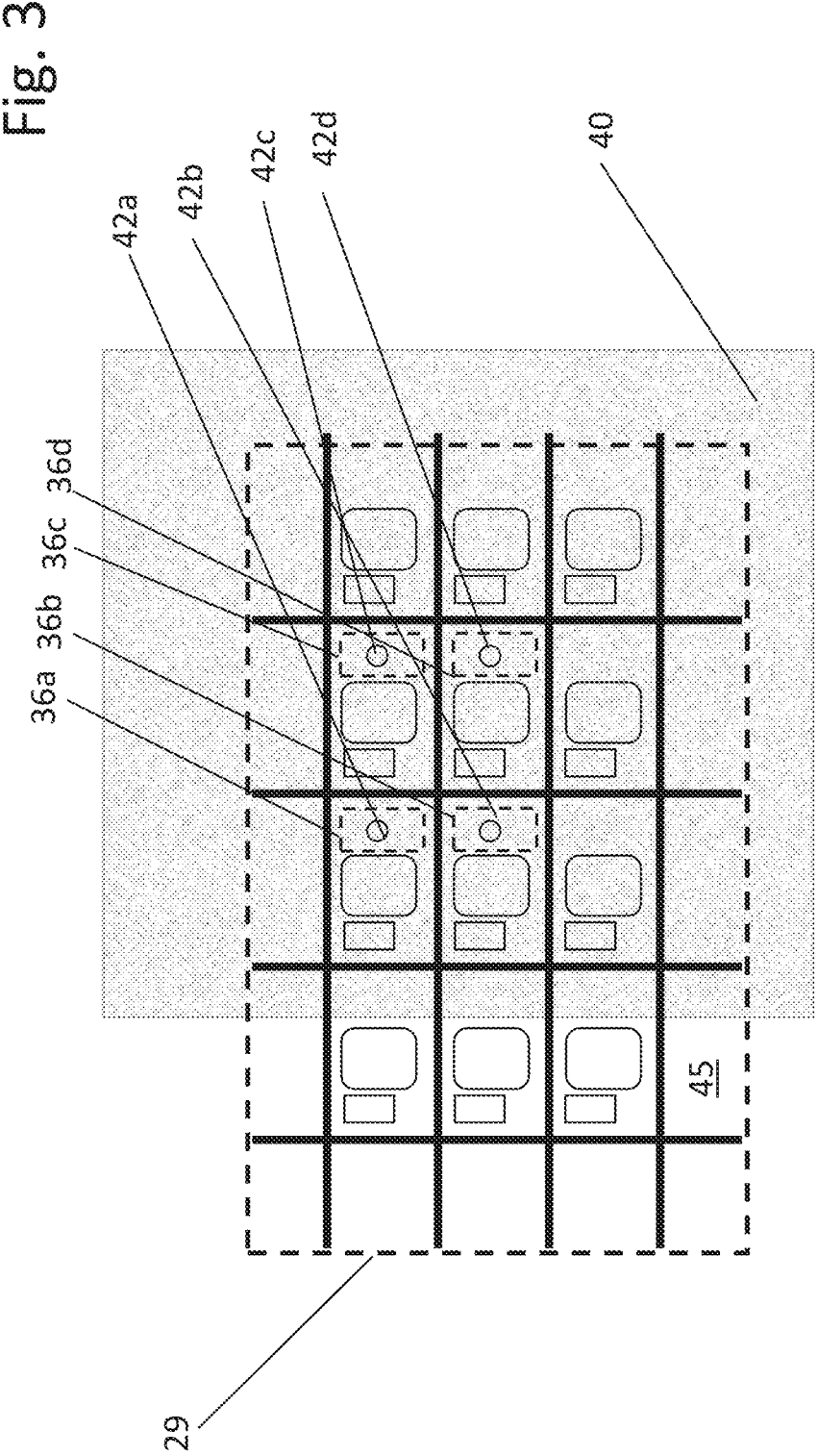

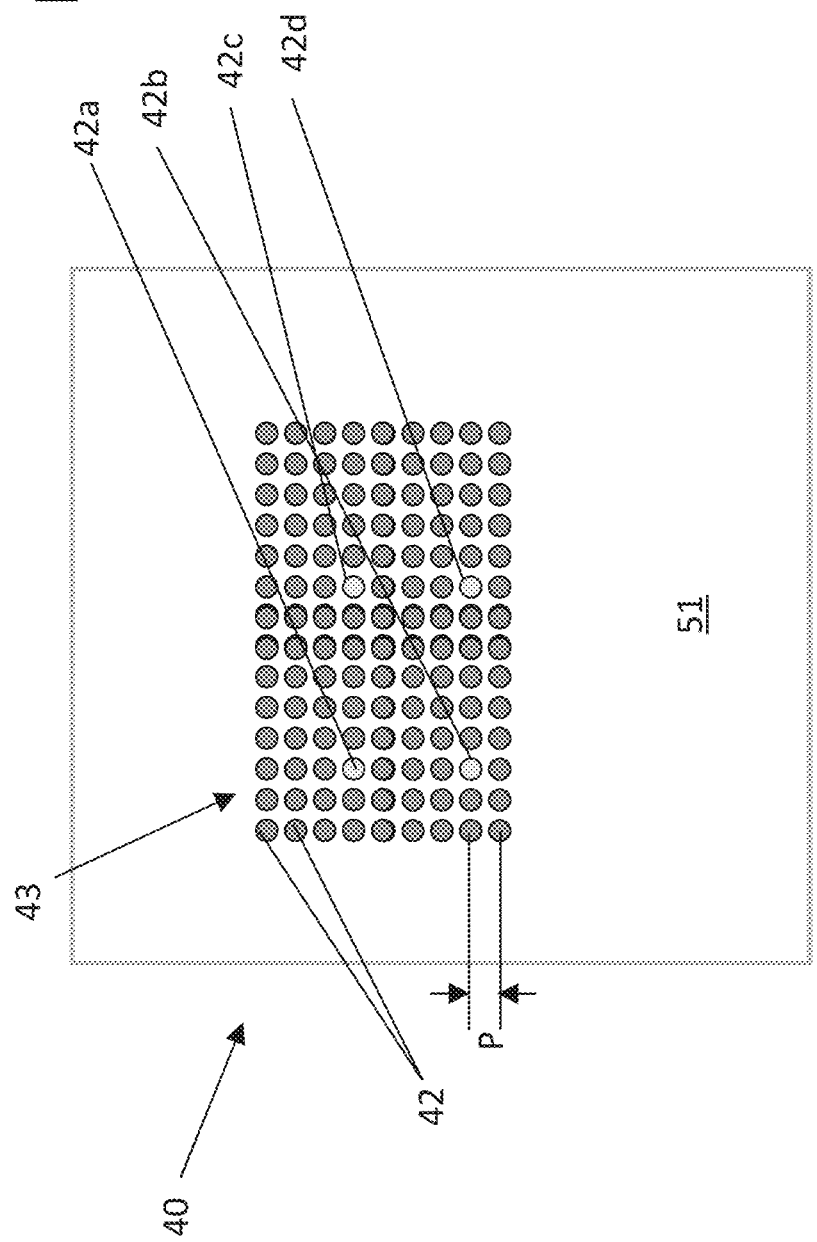

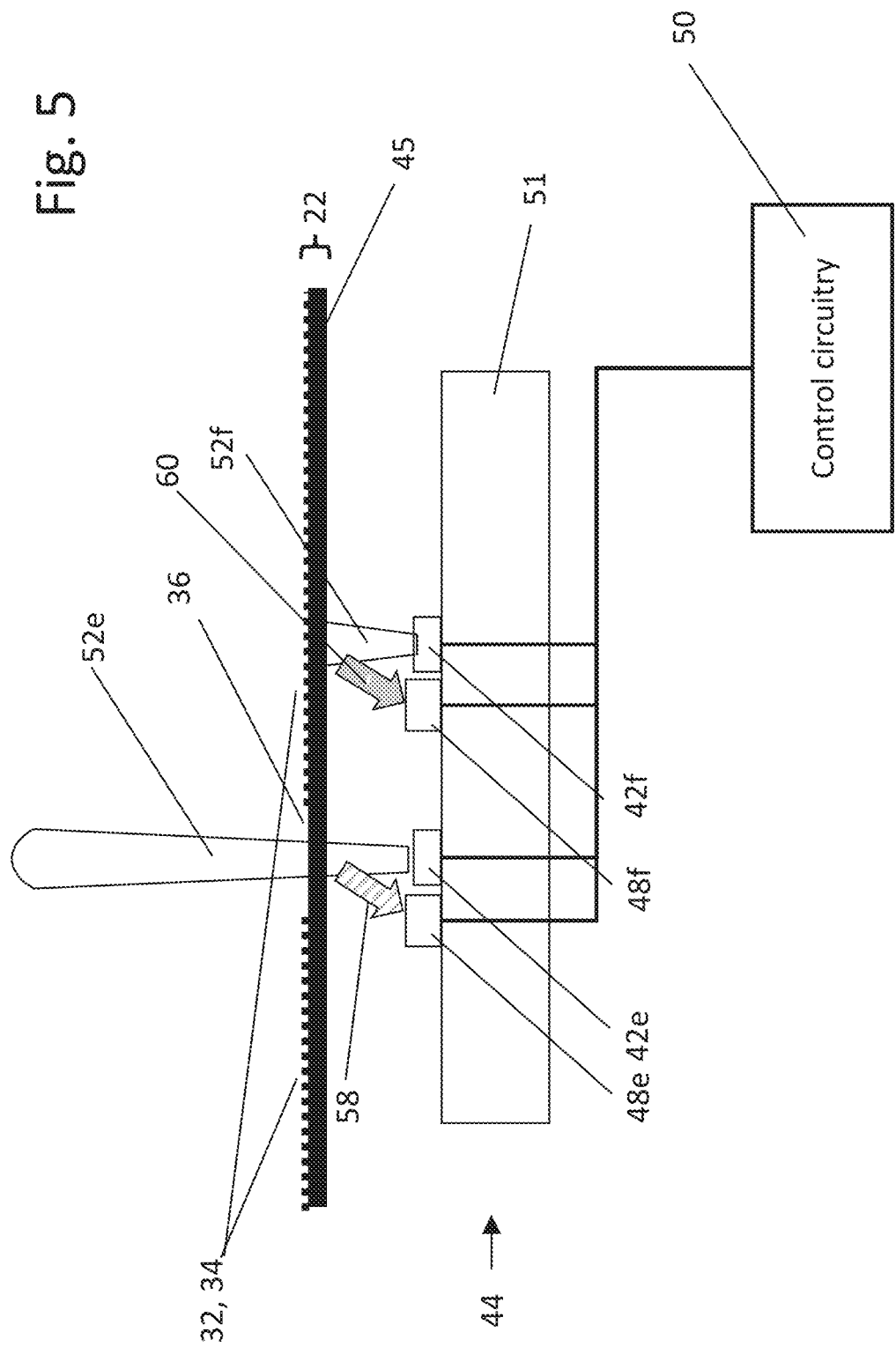

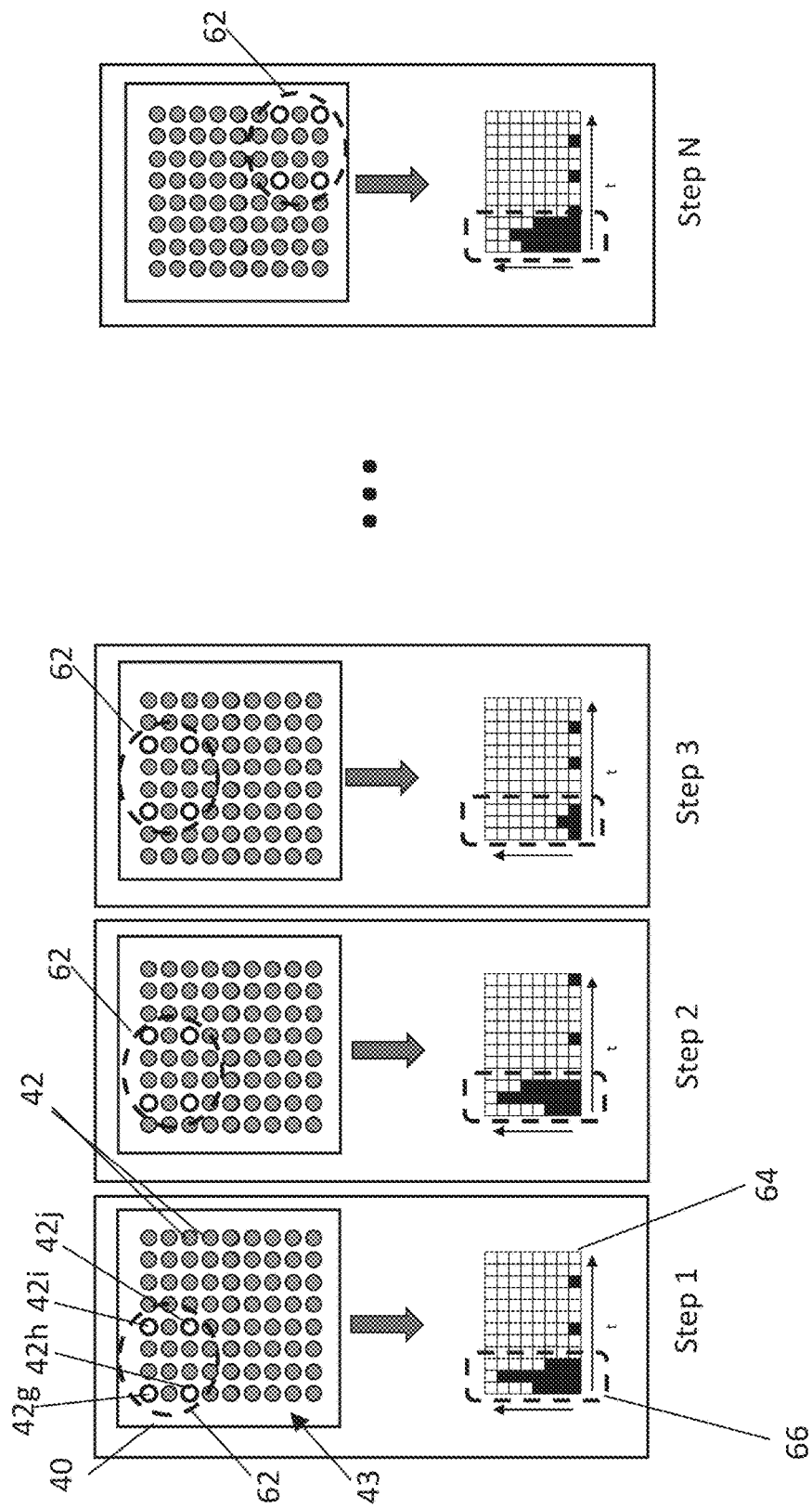

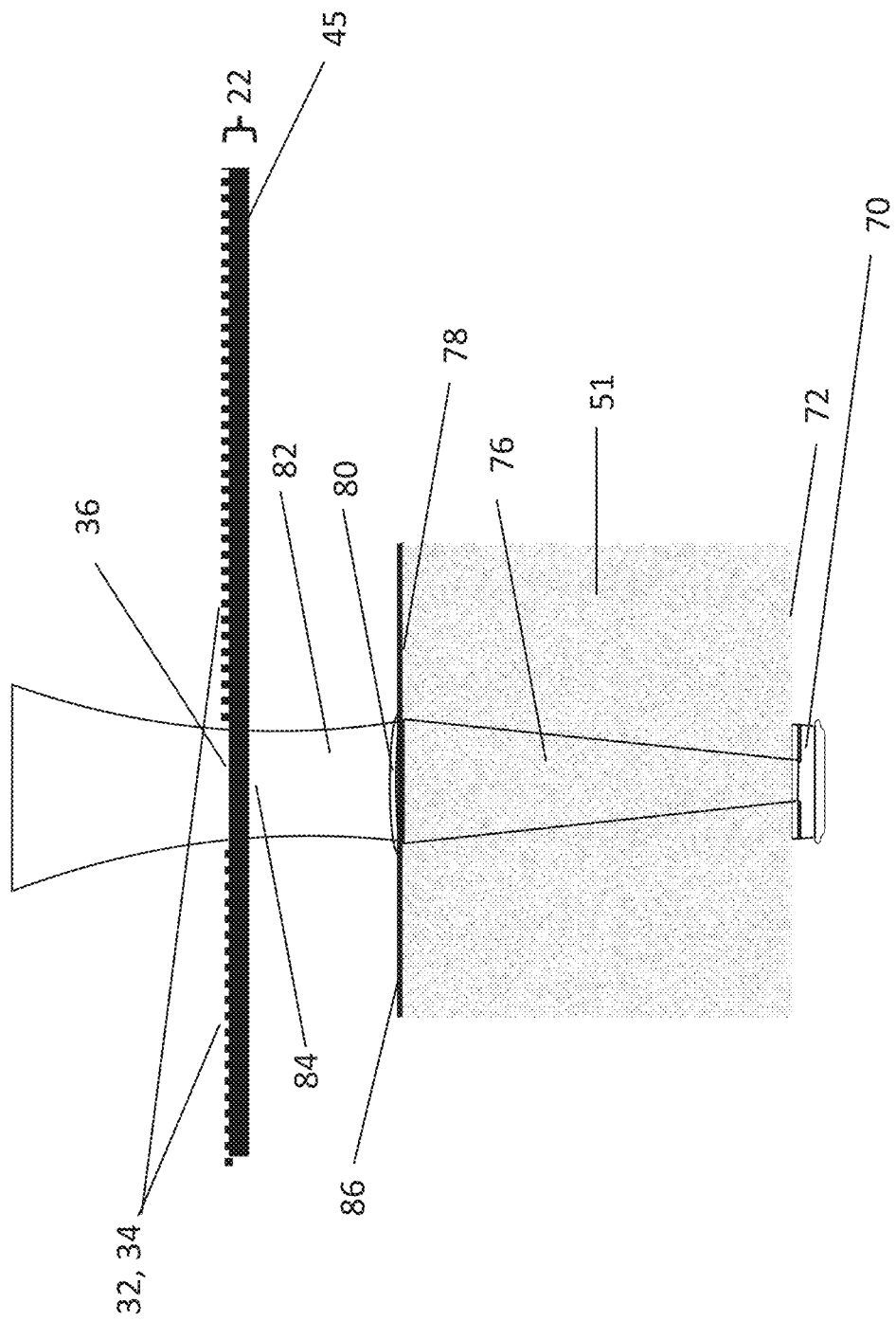

EMITTERS BEHIND DISPLAY

CROSS-REFERENCE TO RELATED APPLICATION

This application claims the benefit of U.S. Provisional Patent Application 63/008,852, filed Apr. 13, 2020, which is incorporated herein by reference.

FIELD OF THE INVENTION

The present invention relates generally to optoelectronic devices, and particularly to illuminators and displays.

BACKGROUND

Wearable and/or portable consumer devices, such as smartphones, augmented reality (AR) devices, virtual reality (VR) devices, and smart glasses, comprise optical displays, as well as sources of optical radiation.

SUMMARY

Embodiments of the present invention that are described hereinbelow provide improved designs and methods for integrating illuminators with displays.

There is therefore provided, in accordance with an embodiment of the invention, an optoelectronic device, which includes a display, including a first substrate, which is transparent to optical radiation at a given wavelength, and a first array of display cells including pixel circuit elements disposed on the first substrate at a first pitch, with gaps of a predefined size between the pixel circuit elements. An emitter array includes a second substrate, parallel and in proximity to the first substrate, and a second array of emitters, which are disposed on the second substrate at a second pitch that is different from the first pitch, and which are configured to emit optical radiation at the given wavelength toward the first substrate. Control circuitry is configured to identify the emitters that are aligned with the gaps between the pixel circuit elements and to selectively drive the identified emitters to emit the optical radiation through the gaps.

In a disclosed embodiment, the second pitch is smaller than the predefined size of the gaps.

In some embodiments, the device includes a plurality of sensors of the optical radiation configured to detect the optical radiation emitted by the emitters and reflected from the pixel circuit elements, wherein the control circuitry is configured to identify the emitters responsively to the reflected radiation detected by the sensors. Typically, the sensors are disposed on the second substrate. In one embodiment, the sensors are configured to detect a time of flight of the reflected radiation, and the control circuitry is configured to distinguish the radiation reflected from the pixel circuit elements responsively to the detected time of flight. In this case, the sensors may include single-photon avalanche diodes (SPADs).

Alternative or additionally, the sensors are configured to detect an intensity of the reflected radiation, and the control circuitry is configured to distinguish the radiation reflected from the pixel circuit elements responsively to the detected intensity. In a disclosed embodiment, the sensors include photodiodes.

Further additionally or alternatively, the control circuitry is configured to identify the emitters that minimize the radiation that is reflected from the pixel circuit elements and to selectively drive the identified emitters. In a disclosed embodiment, the control circuitry is configured to actuate multiple sets of the emitters to emit the optical radiation in succession, to measure the radiation that is reflected from the display due to each of the sets, and to identify one of the sets of the emitters that is to be selectively driven responsively to the measured radiation.

In some embodiments, the emitters include microlenses, which are configured to focus the optical radiation from each of the emitters to converge to a waist at the first substrate. In one embodiment, the second substrate includes first and second faces, wherein the emitters are formed on the first face of the second substrate and are configured to emit respective beams of radiation through the second substrate, and wherein the microlenses are formed on the second face of the second substrate in respective alignment with the emitters.

In a disclosed embodiment, the emitters include vertical-cavity surface-emitting lasers (VCSELs).

There is also provided, in accordance with an embodiment of the invention, a method for display, which includes providing a display, including a first substrate, which is transparent to optical radiation at a given wavelength, and a first array of display cells including pixel circuit elements disposed on the first substrate at a first pitch, with gaps of a predefined size between the pixel circuit elements. An emitter array, including a second substrate and a second array of emitters, which are disposed on the second substrate at a second pitch that is different from the first pitch and are configured to emit optical radiation at the given wavelength, is placed such that the second substrate is parallel and in proximity to the first substrate and the emitters emit the optical radiation toward the first substrate. The emitters that are aligned with the gaps between the pixel circuit element are identified and are selectively driven to emit the optical radiation through the gaps.

The present invention will be more fully understood from the following detailed description of the embodiments thereof, taken together with the drawings in which:

BRIEF DESCRIPTION OF THE DRAWINGS

FIG. 3 is a schematic front detail view of the display of FIG. 2 superimposed over a VCSEL chip, in accordance with an embodiment of the invention;

FIG. 4 is a schematic frontal view of the VCSEL chip of FIG. 3, in accordance with an embodiment of the invention;

FIG. 5 is a schematic sectional view of a part of an array of emitters and sensors and a display, in accordance with an embodiment of the invention;

FIG. 6 is a schematic representation of a calibration method for selecting VCSELs for actuation, in accordance with an embodiment of the invention; and FIG. 7 is a schematic sectional view of a VCSEL with an integral microlens under a display, in accordance with another embodiment of the invention.

DETAILED DESCRIPTION OF EMBODIMENTS

Figure 1:
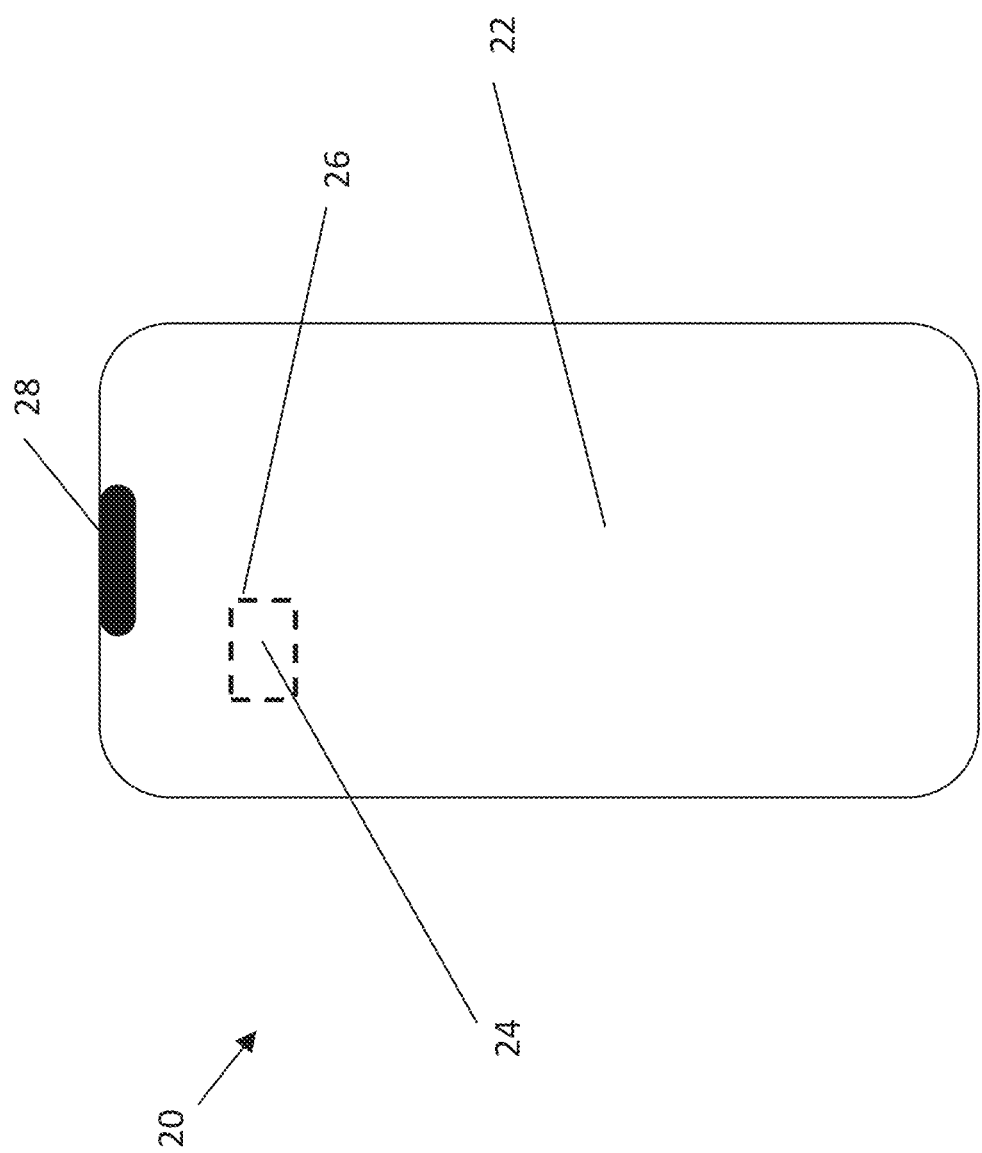
FIG. 1 is a schematic frontal view of a portable device, in accordance with an embodiment of the invention.

Various sorts of portable computing devices (referred to collectively as "portable devices" in the description), such as smartphones, augmented reality (AR) devices, virtual reality (VR) devices, smart watches, and smart glasses, comprise both optical displays and sources of optical radiation. (The terms "optical rays," "optical radiation," and "light," as used in the present description and in the claims, refer generally to any and all of visible, infrared, and ultraviolet radiation.) For example, the front side of a smartphone may include a display screen, a camera for capturing images of the user's face, and an illumination source for illuminating the face during image capture. The ongoing increase in the size, resolution, and brightness of the displays of these portable devices imposes strict limitations on the space available for apertures of various emitter and sensor modules within the front sides these devices.

Display layouts can be designed with a transparent window in a gap between the pixel circuit elements within each pixel of the display. An emitter, such as a VCSEL (vertical-cavity surface-emitting laser), placed behind this window and aligned with it will emit an optical beam through the window. Consequently, an array of emitters behind an array of windows can provide illumination for applications of the portable device, such as 3D mapping or face recognition. Efficient transmission of the radiation through the windows, however, requires aligning the emitters with the respective windows to an accuracy of a few microns. Mechanical alignment to this degree of accuracy between an array of emitters and a display is very difficult, if not impossible, using currently available fabrication methods.

The embodiments of the present invention that are described herein address these problems by providing an optoelectronic device comprising a display with a given pixel pitch and an emitter array, mounted behind the display, with an emitter pitch that is different from the pixel pitch. As a result of the difference in the pitches, most of the emitters will not be aligned with the transparent windows defined by the gaps between the pixel circuit elements, but some of the emitters will be aligned with respective gaps. Control circuitry identifies the emitters that are aligned with the gaps between the pixel circuit elements and selectively drives these emitters to emit their optical radiation through the gaps. The remaining emitters are typically not actuated (except possibly during a test and calibration phase). Thus, the need for precise manufacturing alignment of the emitter array behind the display is obviated.

In the disclosed embodiments, the display comprises an array of display cells formed on a first substrate, such as a glass substrate, which is transparent to optical radiation at the wavelength emitted by the emitter array. Each display cell comprises one or more gaps between the pixel circuit elements, providing windows at the emitter wavelength. The emitter array in formed on a second substrate, such as a semiconductor substrate, which is mounted parallel and in proximity to the first substrate, and oriented so that the emitters emit optical radiation toward the first substrate.

The pitch of the emitter array can advantageously be made smaller than either of the lateral dimensions of the transparent windows in the display cells. In this case, even with only coarse lateral mechanical alignment, some emitters are always aligned with respective windows.

Various calibration procedures can be used to identify the emitters that are to be actuated, and possibly to change the selection in the field. (Such changes may be necessitated, for example, due to shifts in alignment over time, particularly if the device undergoes some mechanical shock.) For this purpose, in some embodiments, the emitter array also comprises sensors, which may be either interspersed with the emitters or arrayed in some other location on the second substrate, or may be disposed on a separate substrate. The control circuitry uses the sensors to measure the radiation from each emitter that is reflected back from the pixel circuit elements toward the second substrate. Emitters that are aligned with respective gaps have low back-reflection and are identified for actuation on this basis. In one embodiment, which is described in detail hereinbelow, the control circuitry measures the time between emission of pulses from the emitters and detection of photons at the sensors in order to identify the short-range reflections that are characteristic of back-reflection from the pixel circuit elements.

FIG. 1 is a schematic frontal view of a portable device 20, in accordance with an embodiment of the invention. Portable device 20 comprises a display 22, covering most of the front of the portable device. Portable device 20 further comprises an optical radiation source 24, which may be utilized for applications such as, for example, 3D mapping or face recognition. The embodiments of the invention enable the placement of source 24 behind an active part of display 22, as indicated by a dotted-line frame 26. Such a placement of source 24 saves display area, as otherwise the source would have to be placed in a notch area 28 (utilized for other devices, for example cameras and other radiation sensors), thus enlarging the notch and consequently reducing the useful area of display 22.

Figure 2:
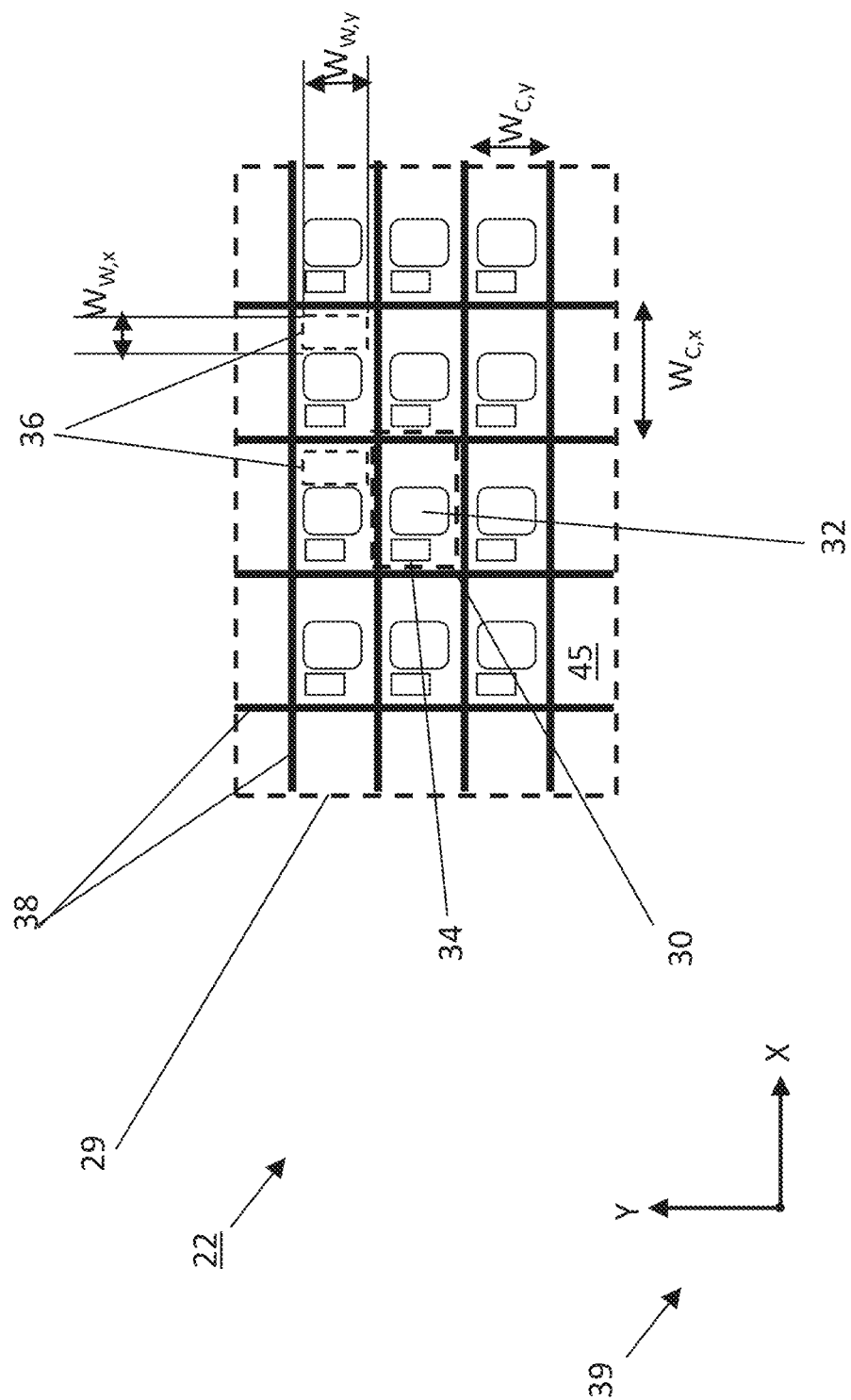
FIG. 2 is a schematic front detail view of a display, in accordance with an embodiment of the invention.

FIG. 2 is a schematic frontal view of a detail 29 of display 22, in accordance with an embodiment of the invention. Display 22 comprises a substrate 45, such as glass, which is transparent to optical radiation at wavelengths in the visible and near infrared ranges. An array of display cells 30 is formed on substrate 45 by methods of display fabrication that are known in the art. Each display cell 30 comprises pixel circuit elements disposed on substrate 45, such as an OLED (organic light-emitting diode) 32 and a TFT (thin-film transistor) 34 for switching the OLED, as well as conductors 38 connecting the pixel circuits to electronics external to display 22.

Display cells 30 are spaced on substrate 45 at a certain pixel pitch, with gaps 36 of a predefined size, defining transparent windows, between the pixel circuit elements. In the pictured example, cells 30 have a pitch in the x-direction of $W_{C,x}=80$ μm and a pitch in the y-direction of $W_{C,y}=60$ μm. The dimensions of gap 36 are an x-width of $W_{W,x}=20$ μm and a y-width of $W_{W,y}=50$ μm. The x- and y-directions are indicated by Cartesian coordinate axes 39.

Detail 29 is presented only as an example of display cells 30 with gaps 36 of typical dimensions. Other kinds of display cells, with other layouts and dimensions and other kinds of pixel circuit elements, may be used, as long as they include a sufficient gap to serve as a transparent window in each cell 30.

FIG. 3 is a schematic view of detail 29 of display 22 superimposed over an emitter array, such as a VCSEL chip 40, in accordance with an embodiment of the invention. VCSELs 42a, 42b, 42c, and 42d on chip 40 are visible through respective gaps 36a, 36b, 36c, and 36d and are selectively driven to emit optical radiation through the respective gaps. The arrangement of a 2×2 matrix of VCSELs 42a, 42b, 42c, and 42d in this manner may be used, for example, for providing illumination for a proximity sensor. In alternative embodiments, different arrangements and numbers of VCSELs 42 may be used.

FIG. 4 is a schematic frontal view of VCSEL chip 40 of FIG. 3, in accordance with an embodiment of the invention. VCSEL chip 40 comprises a matrix 43 of VCSELs 42, disposed on a substrate 51, such as a semiconductor substrate. VCSELs 42a, 42b, 42c, and 42d in matrix 43 are the specific VCSELs that are aligned with gaps 36a, 36b, 36c, and 36d in FIG. 3. These VCSELs are identified and are driven selectively to emit optical radiation through the respective gaps 36, while the remaining VCSELs in matrix 43 are not actuated.

Matrix 43 is laid out in this example at an equal pitch P in both x- and y-dimensions, although other arrangements of the emitters are also possible. Pitch P is different from the dimensions $W_{W,x}$ or $W_{W,y}$ of gap 36 and is advantageously smaller than the gap dimensions, in order to ensure that there will be at least one VCSEL 42 aligned with each gap. For example, for the dimensions given in FIG. 2, pitch P may be chosen to be on the order of 10 μm or less. Choosing a pitch P that is much smaller than either of the two dimensions of gap 36 ensures that even coarse lateral alignment tolerance between VCSEL chip 40 and display 22 will yield an alignment of a VCSEL 42 with each desired gap 36. ("Lateral alignment" refers to alignment in the plane of VCSEL chip 40.) In an alternative embodiment, VCSELs 42 may be arranged in a matrix with unequal pitches $P_x$ and $P_y$ in the x- and y-dimensions, respectively, with the requirement that $P_x < W_{W,x}$ and $P_y < W_{W,y}$, wherein x and y again refer to the Cartesian coordinate axes 39 of FIG. 2.

FIG. 5 is a schematic sectional view of a part of an array 44 of emitters and sensors and of display 22, in accordance with an embodiment of the invention. Array 44 is positioned under display 22 in proximity and parallel to it. Array 44 comprises pairs of emitters—in this embodiment VCSELs 42—and sensors—in this embodiment SPADs (single-photon avalanche diodes) 48—on substrate 51. Only two emitter/sensor pairs, VCSELs 42e and 42f and SPADs 48e and 48f, are shown for the sake of simplicity. Substrate 51 may comprise, for example, a silicon substrate with CMOS (complementary metal-oxide semiconductor) circuitry for forming SPADs 48 and for driving both the SPADs and VCSELs 42. Alternatively, other types of emitters and sensors may be used, and a given sensor may be shared among multiple emitters.

Control circuitry 50 is coupled to VCSELs 42 and SPADs 48. Array 44 in the pictured example is positioned under display 22 so that the pair comprising VCSEL 42e and SPAD 48e is aligned with gap 36, whereas the pair comprising VCSEL 42f and SPAD 48f is not aligned with a gap. SPADs detect the optical radiation emitted by the corresponding VCSELs 42 and reflected from the pixel circuit elements, such as OLEDs 32, TFTs 34, and conductors 38. Control circuitry 50 identifies the emitters that are aligned with gaps 36 based on the reflected radiation detected by the SPADs. Specifically, control circuitry 50 identifies the VCSELs that minimize the radiation that is reflected from the pixel circuit elements and selectively drives these identified emitters. The remaining VCSELs 42 in array 44 are not driven and remain inactive. Circuitry that can be used for this sort of selective actuation of VCSELs is described, for example, in U.S. Patent Application Publication 2019/0363520, whose disclosure is incorporated herein by reference. This selective actuation scheme is useful in reducing the power consumed by the VCSEL chip, as well as reducing the amount of stray light that is reflected into device 20.

As shown in FIG. 5, VCSELs 42e and 42f emit respective beams 52e and 52f of optical radiation. Beam 52e is transmitted through gap 36 (above VCSEL 42e) into the space above display 22. Only a small portion of the beam is reflected to SPAD 48e due to residual surface reflections from substrate 45 (typically a few percent), indicated by an arrow 58. Beam 52f, however, is blocked by the pixel circuit elements, and consequently a large fraction of beam 52f (with the possible exception of a small portion absorbed by the pixel circuit elements) is reflected toward SPAD 48f, as shown by an arrow 60. Thus, on the basis of the signals from SPADs 48e and 48f, control circuitry 50 can identify and will subsequently drive VCSEL 42e, but will not drive VCSEL 42f.

Although various types of sensors can be used in detecting the reflections from display, SPADs 48 are advantageous in providing an output that is indicative of the time of flight of photons emitted by VCSELs 42 and reflected back to the corresponding SPADs. Control circuitry 50 estimates the time of flight based on the time difference between each pulse applied to drive a VCSEL and the detection pulse output by the corresponding SPAD. Reflections from the pixel circuit elements will be characterized by very short times of flight, and thus can be distinguished from reflections that may reach the SPADs from more distant objects in front of device 20.

In an alternative embodiment, the sensors of optical radiation comprise analog photodiodes, rather than SPADs 48. Control circuitry 50 receives from the photodiodes, via an analog-to-digital converter, for example, a signal representing the integrated intensity of the reflected radiation. In this case, control circuitry 50 will select the VCSELs for which the reflected signals were weak, indicating that are probably located behind gaps 36.

To make use of this phenomenon in identifying the VCSELs 42 that are aligned with gaps 36, control circuitry 50 actuates in succession multiple VCSELs or sets of VCSEL 42 to emit optical radiation as trains of short pulses. Control circuitry 50 further receives and measures signals from SPADs 48, and calculates the times of flight and numbers of the received pulses. As the return pulses, indicated by arrows 58 and 60, return from display cells 30, the calculated times of flight are equal, representing the round-trip distance from VCSEL 42 to the display and then to SPAD 48. However, due to the much smaller reflectance from substrate 45 at gap 36 than from the pixel circuit elements, such as OLEDs 32 and TFTs 34, the number of the pulses received by SPAD 48e with short time of flight will be much smaller than the number received by SPAD 48f. This difference in the pulse counts provides control circuitry 50 with the means to identify those VCSELs 42 that are aligned with gaps 36 based on minimized reflected radiation.

FIG. 6 is a schematic representation of a calibration method for identifying those VCSELs 42 that are aligned with gaps 36, in accordance with an embodiment of the invention. The disclosed method comprises N successive steps, which are detailed below. FIG. 6 shows steps 1, 2, 3, and N, and the details of the method are shown in step 1.

A set of VCSELs 42 in matrix 43 of VCSEL chip 40 is defined by a unit cell 62 of four VCSELs 42g, 42h, 42i, and 42j, forming a 2×2 matrix. (The four VCSELs forming the unit cell are marked by clear centers.) Unit cell 62 also comprises four SPADs 48, each associated with one of the four VCSELs 42 of the unit cell (as shown in FIG. 5, but omitted from FIG. 6 for the sake of simplicity). The transverse (x,y) dimensions of the 2×2 matrix are selected to be an integer multiple of the pitches $W_{C,x}$ and $W_{C,y}$ of display cells 30 (FIG. 2). Since the pitch P of matrix 43 is much smaller than either of the dimensions $W_{W,x}$ or $W_{W,y}$ of gap 36, at least one of unit cells 62 will have its four VCSELs aligned with respective gaps in four corresponding display cells 30. (Even if the lateral dimensions of the 2×2 matrix of unit cell 62 are not an exact multiple of the pitches $W_{C,x}$ and $W_{C,y}$, a selection for alignment is possible due to the small pitch P.)

The objective of the method of FIG. 6 is to identify one of unit cells 62 in VCSEL matrix 43 that is aligned with gaps 36. The number of steps N is a function of the size of unit cell 62 and the number of VCSELs 42 in matrix 43. Although the present example uses a unit cell comprising a 2×2 matrix of VCSELs 42, unit cells comprising other numbers and arrangements of VCSELs may alternatively be used.

In each of the N steps of the method, control circuitry 50 defines a different position for unit cell 62, i.e., the control circuitry shifts the unit cell across matrix 43 in successive discrete steps of length P. At each step, control circuitry 50 drives the four VCSELs of unit cell 62 to emit a train of short pulses of optical radiation, and receives pulses reflected from display cells 30 from the four SPADs 48 that are associated with the four VCSELs of the unit cell. Control circuitry 50 calculates the total number of pulses from the four SPADs 48 of unit cell 62 as a function of time, as shown in a histogram plot 64. The pulses due to reflection from display cells 30 can be identified based on the short round-trip-time between VCSELs 42 and SPADS, as marked by a dotted line frame 66.

Step 1 shows unit cell 62 in the top-left corner of matrix 43. In plot 64, a large number of pulses are seen within frame 66 (with a few stray pulses outside the frame), indicating a strong reflection back to the four SPADs 48 associated with the current position of unit cell 62. The strong reflection indicates that the four VCSELs in the current location of unit cell 62 are not aligned with gaps 36, but rather the radiation they emit impinges on pixel circuit elements in the corresponding display cells. This situation corresponds to the one shown in FIG. 5 by arrow 60.

In step 2, control circuitry 50 has shifted unit cell 62 by one pitch interval P to the right. Similarly to step 1, a large number of pulses are seen within frame 66, again indicating a misalignment of VCSELs 42 of unit cell 62 vis-à-vis gaps 36.

In step 3, control circuitry 50 has shifted unit cell 62 by a further pitch interval P to the right. Now the number of pulses within frame 66 is considerably lower than in steps 1 and 2, indicating that the SPADs of unit cell 62 in the location of step 3 have received optical radiation reflected from gaps 36. In this location, the four VCSELs of the unit cell are aligned with gaps 36. This situation corresponds to the one shown in FIG. 5 by arrow 58.

In subsequent steps 4, 5, . . . , N, the number of return pulses may be further monitored in order to identify an optimal location of unit cell 62, with a minimal number of pulse counts within frame 66. Control circuitry 50 selects the VCSELs in this unit cell to be driven during the operation of device 20.

Although FIG. 6 shows a certain simple strategy for identification of the optimal choice of VCSELs to be driven, other, more efficient search strategies may alternatively be used and are considered to be within the scope of the present invention.

FIG. 7 is a schematic sectional view of a VCSEL 70 with an integral microlens 80 under display 22, in accordance with another embodiment of the invention. Microlens 80 focuses the optical radiation from VCSEL 70 to converge to a waist 84 at substrate 45 of display 22, and thus to pass cleanly through gap 36. A similar microlens is formed in the beam path of each of the VCSELs in the emitter array, for example the VCSELs in matrix 33.

In the pictured example, VCSEL 70 is formed on a bottom face 72 of substrate 51, and emits optical radiation into the substrate as a beam 76. Substrate 51 may comprise, for example, GaAs (gallium arsenide). Microlens 80 is formed on a top face 78 of substrate 51. This sort of arrangement of a VCSEL with integrated microlens is described, for example, in U.S. patent application Ser. No. 16/779,609, filed Feb. 2, 2020, whose disclosure is incorporated herein by reference. Alternatively, other arrangements of microlenses may be used, as are known in the art.

Microlens 80 transmits and refocuses beam 76 into a beam 82 and projects it towards gap 36 in display 22. Microlens 80, together with VCSEL 70 and substrate 51, is designed and positioned so that waist 84 of beam 82 is located at substrate 45. This design minimizes the cross-section of beam 82 at gap 36 so that the beam may pass through the gap without losses from impinging on pixel circuit elements at the edges of the gap. An anti-reflective coating 86 may be deposited on top face 78 for reduction of reflection losses from the top face.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
   a display, comprising:
      a first substrate, which is transparent to optical radiation at a given wavelength; and
      a first array of display cells comprising pixel circuit elements disposed on the first substrate at a first pitch, with gaps of a predefined size between the pixel circuit elements;
   an emitter array, comprising:
      a second substrate, parallel to the first substrate; and
      a second array of emitters, which are disposed on the second substrate at a second pitch that is different from the first pitch, and which are configured to emit optical radiation at the given wavelength toward the first substrate; and
   control circuitry, which is configured to identify the emitters that are aligned with the gaps between the pixel circuit elements and to selectively drive the identified emitters to emit the optical radiation through the gaps, while the remaining emitters in the second array are not actuated.

2. The optoelectronic device according to claim 1, wherein the second pitch is smaller than the predefined size of the gaps.

3. The optoelectronic device according to claim 1, and comprising a plurality of sensors of the optical radiation configured to detect the optical radiation emitted by the emitters and reflected from the pixel circuit elements, wherein the control circuitry is configured to identify the emitters responsively to the reflected radiation detected by the sensors.

4. The optoelectronic device according to claim 3, wherein the sensors are disposed on the second substrate.

5. The optoelectronic device according to claim 3, wherein the sensors are configured to detect a time of flight of the reflected radiation, and the control circuitry is configured to distinguish the radiation reflected from the pixel circuit elements responsively to the detected time of flight.

6. The optoelectronic device according to claim 5, wherein the sensors comprise single-photon avalanche diodes (SPADs).

7. The optoelectronic device according to claim 3, wherein the sensors are configured to detect an intensity of the reflected radiation, and the control circuitry is configured to distinguish the radiation reflected from the pixel circuit elements responsively to the detected intensity.

8. The optoelectronic device according to claim 7, wherein the sensors comprise photodiodes.

9. The optoelectronic device according to claim 3, wherein the control circuitry is configured to identify the emitters that minimize the radiation that is reflected from the pixel circuit elements and to selectively drive the identified emitters.

10. The optoelectronic device according to claim 1, wherein the emitters comprise microlenses, which are configured to focus the optical radiation from each of the emitters to converge to a waist at the first substrate.

11. The optoelectronic device according to claim 10, wherein the second substrate comprises first and second faces, wherein the emitters are formed on the first face of the second substrate and are configured to emit respective beams of radiation through the second substrate, and wherein the microlenses are formed on the second face of the second substrate in respective alignment with the emitters.

12. The optoelectronic device according to claim 1, wherein the emitters comprise vertical-cavity surface-emitting lasers (VCSELs).

13. An optoelectronic device, comprising:
a display, comprising:
  a first substrate, which is transparent to optical radiation at a given wavelength; and
  a first array of display cells comprising pixel circuit elements disposed on the first substrate at a first pitch, with gaps of a predefined size between the pixel circuit elements;
an emitter array, comprising:
  a second substrate, parallel to the first substrate; and
  a second array of emitters, which are disposed on the second substrate at a second pitch that is different from the first pitch, and which are configured to emit optical radiation at the given wavelength toward the first substrate;
a plurality of sensors of the optical radiation configured to detect the optical radiation emitted by the emitters and reflected from the pixel circuit elements; and
control circuitry, which is configured to identify the emitters that are aligned with the gaps between the pixel circuit elements and to selectively drive the identified emitters to emit the optical radiation through the gaps,
wherein the control circuitry is configured to identify the emitters that minimize the radiation that is reflected from the pixel circuit elements and to selectively drive the identified emitters, and
wherein the control circuitry is configured to actuate multiple sets of the emitters to emit the optical radiation in succession, to measure the radiation that is reflected from the display due to each of the sets, and to identify one of the sets of the emitters that is to be selectively driven responsively to the measured radiation.

14. A method for display, comprising:
providing a display, comprising a first substrate, which is transparent to optical radiation at a given wavelength, and a first array of display cells comprising pixel circuit elements disposed on the first substrate at a first pitch, with gaps of a predefined size between the pixel circuit elements;
placing an emitter array, comprising a second substrate and a second array of emitters, which are disposed on the second substrate at a second pitch that is different from the first pitch and are configured to emit optical radiation at the given wavelength, such that the second substrate is parallel to the first substrate and the emitters emit the optical radiation toward the first substrate;
identifying the emitters that are aligned with the gaps between the pixel circuit elements; and
selectively driving the identified emitters to emit the optical radiation through the gaps, while the remaining emitters in the second array are not actuated.

15. The method according to claim 14, wherein the second pitch is smaller than the predefined size of the gaps.

16. The method according to claim 14, wherein identifying the emitters comprises detecting the optical radiation that is emitted by the emitters and reflected from the pixel circuit elements, and identifying the emitters responsively to the reflected radiation.

17. The method according to claim 16, wherein detecting the optical radiation comprises detecting a time of flight of the reflected radiation, and distinguishing the radiation reflected from the pixel circuit elements responsively to the detected time of flight.

18. The method according to claim 16, wherein detecting the optical radiation comprises detecting an intensity of the reflected radiation, and distinguishing the radiation reflected from the pixel circuit elements responsively to the detected intensity.

19. The method according to claim 16, wherein detecting the optical radiation comprises identifying the emitters that minimize the radiation that is reflected from the pixel circuit elements.

20. The method according to claim 14, wherein the emitters comprise microlenses, which are configured to focus the optical radiation from each of the emitters to converge to a waist at the first substrate.

* * * * *